US012674650B1

(12) United States Patent
Coffee et al.

(10) Patent No.: US 12,674,650 B1
(45) Date of Patent: Jul. 7, 2026

(54) INTEGRATED ADDITIVE MANUFACTURE (AM) OF EXPLOSIVE PAYLOADS

(71) Applicant: Raytheon Company, Arlington, VA (US)

(72) Inventors: Shawn S. Coffee, Tucson, AZ (US); Christopher F. Williams, Tucson, AZ (US); Jude Sprouffske, Marana, AZ (US); Mark W. Olles, Hilton, NY (US); Ian D. Stochl, Bloomfield, NY (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 19/083,057

(22) Filed: Mar. 18, 2025

Related U.S. Application Data

(60) Provisional application No. 63/765,325, filed on Feb. 28, 2025.

(51) Int. Cl.
| | |
|---|---|
| *F42B 1/036* | (2006.01) |
| *B33Y 10/00* | (2015.01) |
| *B33Y 80/00* | (2015.01) |
| *F42B 1/024* | (2006.01) |

(52) U.S. Cl.
CPC .............. *F42B 1/036* (2013.01); *B33Y 10/00* (2014.12); *B33Y 80/00* (2014.12); *F42B 1/024* (2013.01)

(58) Field of Classification Search
CPC .......... F42B 1/024; F42B 1/036; B33Y 10/00; B33Y 80/00; B29C 64/10
See application file for complete search history.

(56) References Cited

U.S. PATENT DOCUMENTS

| | | |
|---|---|---|
| 3,561,361 A | 2/1971 | Kessenich et al. |
| 3,934,511 A | 1/1976 | Cordle et al. |
| 4,430,939 A | 2/1984 | Harrold |
| 5,565,644 A | 10/1996 | Chawla |
| 6,026,750 A | 2/2000 | Nelson |

(Continued)

FOREIGN PATENT DOCUMENTS

| | | | |
|---|---|---|---|
| CA | 2497099 C | 5/2015 | |
| EP | 3705465 A1 * | 9/2020 | ............. C06B 45/12 |

(Continued)

OTHER PUBLICATIONS

"Explosive Assembly With A Linear Shaped Charge End Cap", Purdue Innovates Office of Technology Commercialization, (2024), 2 pgs.

(Continued)

*Primary Examiner* — Benjamin P Lee
(74) *Attorney, Agent, or Firm* — Schwegman Lundberg & Woessner, P.A.

(57) ABSTRACT

Integrated Additive Manufacture (AM) of explosive payloads including both energetic and non-energetic components is achieved by controlling the AM processes such that a temperature of any deposited energetic material is bounded below and away from the energetic material's onset temperature to avoid detonation or decomposition of the energetic material during manufacture. This constraint places requirements on the selection of the energetic materials, the AM processes and 3D printer systems for depositing the non-energetic materials and the final composition and density of the non-energetic components.

20 Claims, 7 Drawing Sheets

(56) References Cited

U.S. PATENT DOCUMENTS

| | | | | |
|---|---|---|---|---|
| 9,534,874 | B2 | 1/2017 | Alford et al. | |
| 9,702,668 | B2 | 7/2017 | Peterson et al. | |
| 9,778,008 | B2 | 10/2017 | Scheid et al. | |
| 10,054,414 | B2 | 8/2018 | Scheid et al. | |
| 10,093,592 | B2 * | 10/2018 | Danforth | F02K 9/12 |
| 10,337,457 | B2 * | 7/2019 | Lynch | F02K 9/12 |
| 10,654,762 | B2 * | 5/2020 | Danforth | F02K 9/12 |
| 10,670,381 | B1 | 6/2020 | Anderson et al. | |
| 10,844,696 | B2 | 11/2020 | Eitschberger et al. | |
| 11,027,482 | B2 * | 6/2021 | Sullivan | B33Y 30/00 |
| 11,852,101 | B1 * | 12/2023 | Hundley | F02K 9/96 |
| 12,253,051 | B2 * | 3/2025 | Hundley | F02K 9/24 |
| 12,398,685 | B1 * | 8/2025 | Hundley | B33Y 50/00 |
| 12,428,357 | B2 * | 9/2025 | Straathof | C06B 21/0033 |
| 12,454,929 | B1 * | 10/2025 | Hare | F02K 9/10 |
| 2016/0355447 | A1 * | 12/2016 | Danforth | C06B 21/0033 |
| 2017/0225389 | A1 * | 8/2017 | Sullivan | B33Y 10/00 |
| 2017/0241754 | A1 * | 8/2017 | Gash | F42B 1/02 |
| 2017/0253536 | A1 * | 9/2017 | Danforth | B05B 7/22 |
| 2018/0194699 | A1 * | 7/2018 | Spence | C06B 33/02 |
| 2018/0223770 | A1 * | 8/2018 | Lynch | B33Y 80/00 |
| 2019/0100474 | A1 * | 4/2019 | Straathof | C06B 45/105 |
| 2020/0048158 | A1 * | 2/2020 | Wallace | C06B 21/0033 |
| 2022/0177387 | A1 * | 6/2022 | Straathof | B29C 64/209 |

FOREIGN PATENT DOCUMENTS

| | | | | | |
|---|---|---|---|---|---|
| EP | | 3804887 A1 * | 4/2021 | | B33Y 70/00 |
| WO | WO-2011086364 A1 | | 7/2011 | | |

OTHER PUBLICATIONS

"Linear Shaped Charge", Ensign Bickford Aerospace and Defense, (Jun. 7, 2024), 3 pgs.

Xue, Hao, et al., "Perspectives on Additive Manufacturing for Warhead Applications", Science Direct Defence Technology, (Feb. 27, 2024), 27 pgs.

* cited by examiner

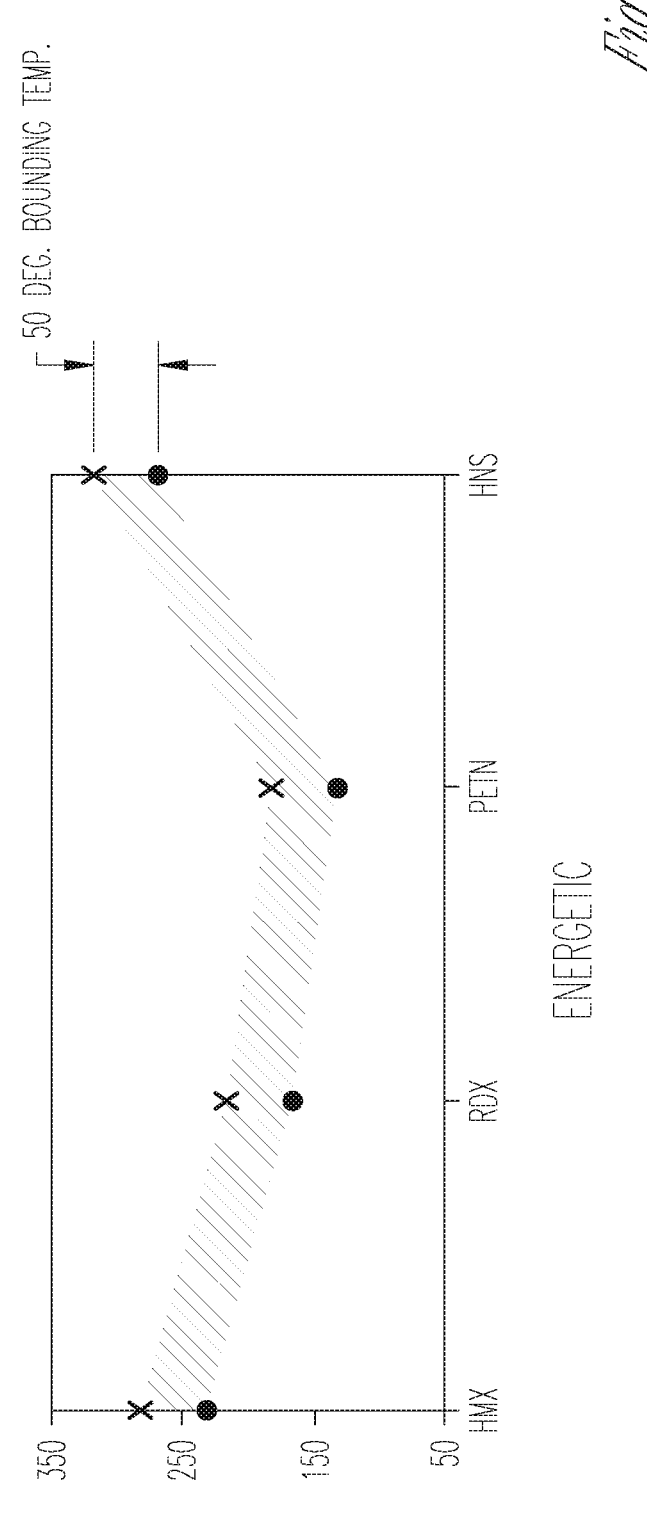
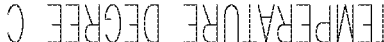
*Fig. 1*

| COMMON NON-ENERGETIC AM POLYMER BINDERS | PRINT HEAD TEMP. | ENERGETICS COMPATIBLE WITH BINDER |
|---|---|---|
| POLYLACTIC ACID | 180°C – 220°C | HMX, HNS |
| ACRYLONITRILE BUTADIENE STYRENE | 220°C – 250°C | HMX, HNS |
| POLYETHYLENE TEREPHTHALATE GLYCOL-MODIFIED | 230°C – 250°C | HNS |
| THERMOPLASTIC ELASTOMER | 210°C – 260°C | HMX, HNS |

*Fig. 2*

| NON-ENERGETIC MATERIAL | MATERIAL LOAD BY MASS | PRINTED DENSITY | SINTERING TEMPERATURE | POST-SINTER DENSITY |
|---|---|---|---|---|
| ALUMINUM 6061 | 65.0–68.5 % | 1.5 g/cc | 620 °C | 2.7 g/cc |
| COPPER | 87.0–90.0 % | 4.6 g/cc | 1052 °C | 8.9 g/cc |
| INCONEL 718 | 82.0–85.0 % | 3.2 g/cc | 1260 °C | 8.5 g/cc |
| STAINLESS STEEL 17-4 | 80.0–85.0 % | 3.0 g/cc | 1260 °C | 7.5–8.0 g/cc |
| STAINLESS STEEL 316L | 80.0–85.0 % | 3.5 g/cc | 1260 °C | 7.5–8.0 g/cc |
| TUNGSTEN | 88.0–94.0 % | 7.8 g/cc | 2200 °C | 19.3 g/cc |
| TITANIUM 64-5 | 78.0–82.0 % | 2.5 g/cc | 1350 °C | 4.5 g/cc |
| SILICON CARBIDE | 63.0–65.0 % | 1.9 g/cc | 1860 °C | 2.3 g/cc |
| ZIRCONIUM SILICATE | 64.0–69.0 % | 2.1 g/cc | 1500 °C | 4.6 g/cc |

*Fig. 3*

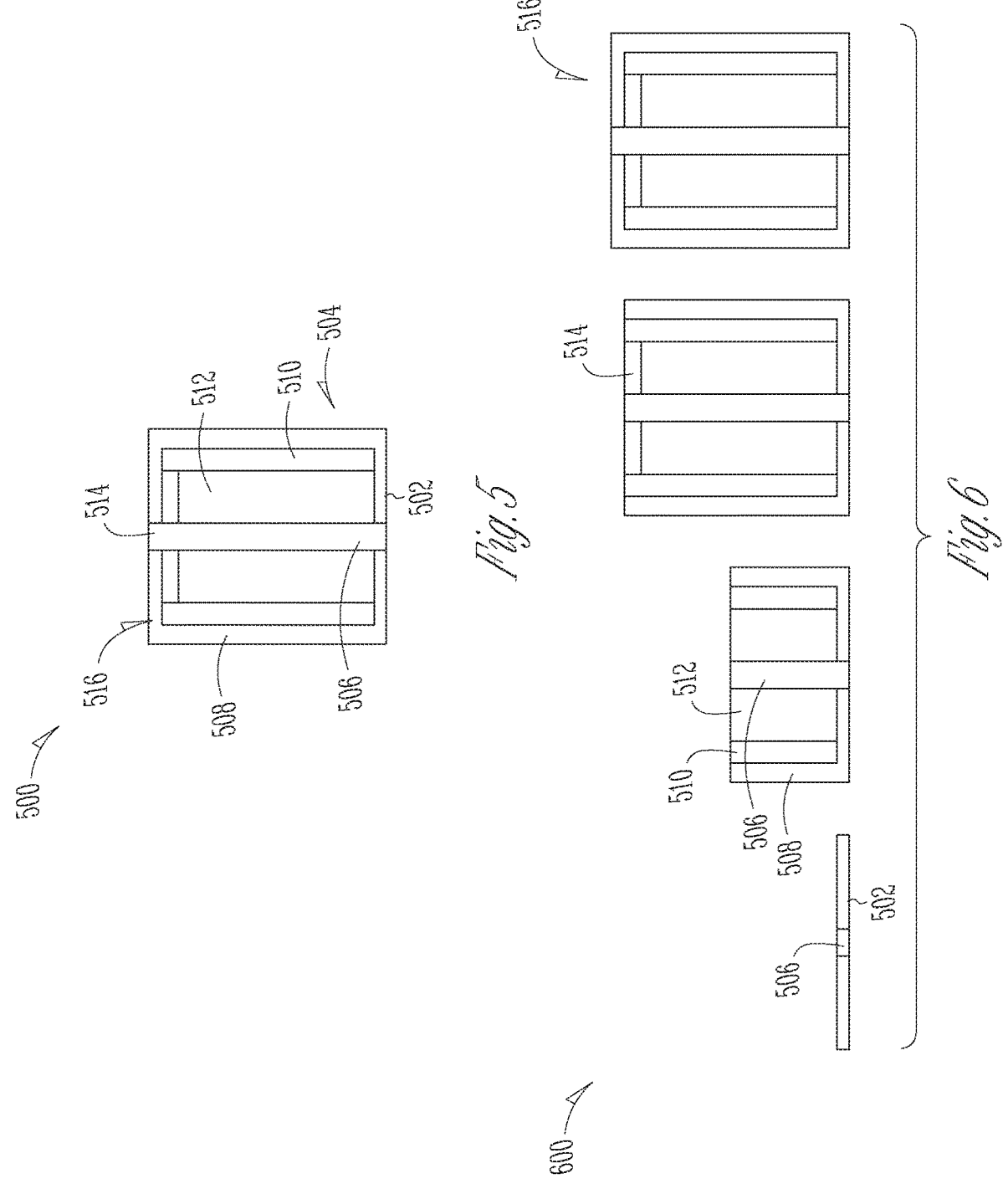

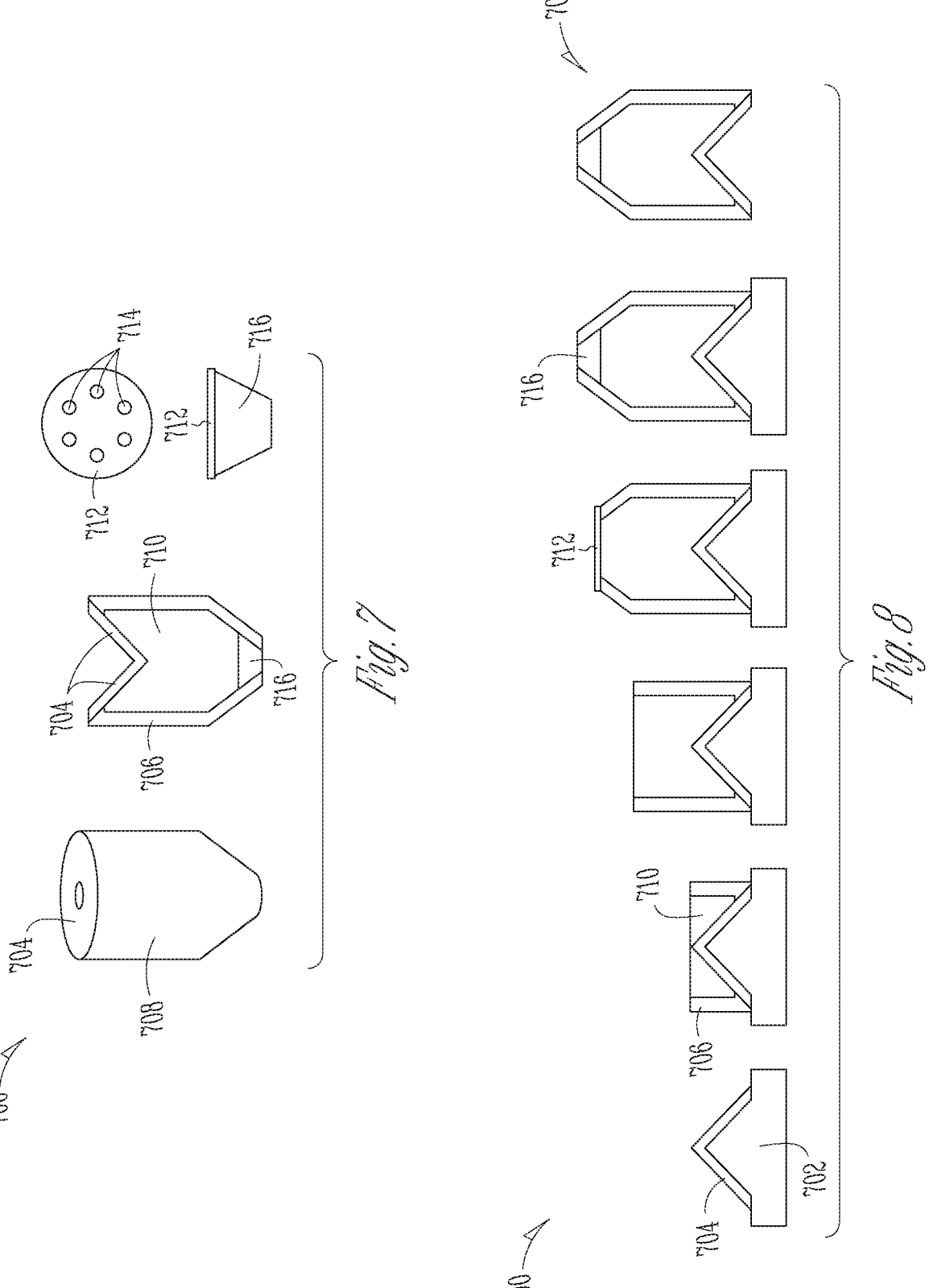

INTEGRATED ADDITIVE MANUFACTURE (AM) OF EXPLOSIVE PAYLOADS

CLAIM OF PRIORITY

This patent application claims the benefit of U.S. Provisional Patent Application No. 63/765,325, filed Feb. 28, 2025, which is incorporated by reference herein in its entirety.

BACKGROUND

Field

This disclosure relates to explosive payloads and, more particularly, to the additive manufacture (AM) of explosive payloads that include both energetic and non-energetic components.

Description of the Related Art

"Warheads can be generally divided into fragmentation, shaped charge and penetrating warheads. The main structures include the shell, the charge, the detonation and safety mechanism and so on. A large number of high-speed fragments are formed to attack armored vehicles and personnel targets under the explosion of high-energy explosives in the fragmentation warhead. The shaped charge warhead is used to attacked armored tank and vehicle targets, relying on a high-speed metal jet that appears on the axis of the warhead after the explosive of the grooved explosive. The penetrating warhead has usually a thick shell (high penetration ability) and massive charge (high blast effect)." Hao Xue et. al., "Perspective on Additive Manufacturing for Warhead Applications", Defence Technology, available online Mar. 19, 2024, "1. Introduction".

As further described in the Introduction, "the traditional manufacturing process of fabricating warheads include turning, milling, drilling, grinding, cutting boring methods, most of which belong to the "subtractive manufacturing" (SM) process as the produce is fabricated by removing materials. The materials used in the SM process have stable mechanical properties, and the research on the lethality characteristics of the tradition warhead structures fabricated by SM is relatively mature. However, SM often faces the problems of cumbersome manufacturing steps, low material utilization, and large manpower consumption."

As described in the Abstract, "Additive manufacture (AM) technology can fabricate complex structures, with classified materials composition and customized components, while achieving low cost, high accuracy, and rapid production of parts." From our survey, PBF, DED and EBM technologies are main used to manufacture warhead damage elements, FDM and DIW technologies are mainly used to manufacture warhead charges." The different AM technologies may be used to build discrete warhead damage elements or warhead charges that could be assembled to form the warhead. The warhead damage elements may be placed in an oven and sintered at high temperatures to remove the polymer binder used to facilitate deposition of the materials.

In subsection (3) of the Summary and Prospects, the paper refers to FIG. 30 as a "possible idea" for an integrated AM process of the warhead shell and charge. As shown, in a single 3D printer, metal powders and explosive ink are selectively fed to and dispensed by a common printer head and nozzle to control the delivery of the warhead shell and charging raw materials to manufacture the warhead layer-by-layer greatly shortening the warhead manufacturing cycle.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure describes an integrated additive manufacturing (AM) process for an explosive payload including both energetic and non-energetic materials.

In an embodiment, one or more additive manufacturing processes are used to selectively deposit energetic and non-energetic materials in a layer-by-layer sequence to build at least one energetic component and at least one non-energetic component to form an explosive payload. The energetic material's AM compatibility is characterized by an onset temperature at which the energetic material may detonate. A first portion of at least one non-energetic component and a first portion of at least one energetic component are built in a common layer. A second portion of at least one non-energetic component is built on a top surface of a second portion of at least one energetic component. Once energetic material has been deposited, the additive manufacturing process that is used to build the at least one non-energetic component is controlled such that a temperature of any deposited energetic material is bounded below and away from the energetic material's onset temperature to avoid detonation or decomposition of the energetic component during manufacture.

In different embodiments, the temperature of the deposited energetic material can be bounded below and away from the onset temperature by at least 50 degrees C., by controlling the AM process such that its maximum temperature is less than the offset temperature or at least 50 degrees C. less than the offset temperature of by forming an insulating layer on the top surface of the energetic component. The maximum temperature of the AM process is determined by the print head temperature required to deposit the non-energetic material for a given polymer binder.

In different embodiments, a polymer binder is added to the non-energetic material to facilitate deposition of the material. The AM process to form the non-energetic component forgoes sintering at temperatures above the onset temperature to remove the polymer binder after deposition leaving a non-zero percentage of polymer binder in the non-energetic component. In certain embodiments, the non-energetic component is built prior to deposition of any energetic material. In this case, the AM process is not temperature constrained. The non-energetic component can be sintered to remove the polymer binder thereby increasing the density and resultant bulk properties are closer to that of the non-energetic component.

In different embodiments, the non-energetic material may consist of a singular or a combination of metals, ceramics, glasses or polymers. The process used to build the at least one non-energetic component is selected from direct pellet extrusion (DPE), Fused Filament Fabrication (FFF) aka Fused Deposition Modeling (FDM), stereolithography (SLA), direct write (DW) syringe (non-metals) and slurry-based screw extrusion.

In different embodiments, the AM process used to build the energetic component from the energetic material is selected from one of DW syringe, DPE, slurry-based screw extrusion, and SLA.

In an embodiment, a single DPE AM process is used to build both the energetic and non-energetic components.

In an embodiment, the non-energetic material includes a polymer binder. The deposition temperature of the polymer binder must be below, and preferably bounded away from, the onset temperature of the energetic material. The energetic material is selected from HMX or HNS or other proprietary energetic materials such that the deposition temperature is bounded away from the material's onset temperature.

In different embodiments, one or more 3D printers are configured to implement the one or more AM processes. In one embodiment, a single 3D printer is configured for FDM including a printer head that deposits energetic material and a printer head that deposits non-energetic material. Each printer head operates in a narrow temperature range to deposit the material. The temperature range of the non-energetic printer head lying above the onset temperature of the energetic material. In another embodiment, a single 3D printer is configured with multiple printer heads for different AM processes. In another embodiment, the explosive payload is moved back-and-forth on a stage between a 3D printer configured to implement an AM process to deposit energetic material and a 3D printer configured to implement an AM process to deposit non-energetic material.

In an embodiment, the one or more integrated AM processes build at least one energetic component including both an internal booster charge and a main charge, each having an onset temperature. The AM processes are controlled such that the temperature of any deposited energetic material is bounded below and away from the lowest onset temperature.

In an embodiment, one or more integrated AM processes are used to build a fragmentation warhead in which the internal booster charge is positioned axially at the center of the main charge. The additive manufacturing processes build a casing as the non-energetic component and the internal booster charge and main charge layer-by-layer. The casing may be built to included preformed fragments.

In an embodiment, one or more integrated AM processes are used to build a shaped-charge (SC) warhead, either a shaped-charge jet or an explosively formed penetrator. In an embodiment, the shaped-charge liner is built prior to the deposition of any energetic material. The liner AM process is not temperature constrained by the onset temperature and the shaped-charge liner is sintered to increase its density.

In an embodiment, one or more integrated AM processes are used to build a penetrating warhead. In an embodiment, the penetrator is built prior to the deposition of any energetic material. The penetrator AM process is not temperature constrained by the onset temperature and the penetrator is sintered to increase its density.

These and other features and advantages of the disclosure will be apparent to those skilled in the art from the following detailed description of preferred embodiments, taken together with the accompanying drawings, in which:

BRIEF DESCRIPTION OF THE DRAWINGS

FIG. 1 is a plot of onset temperatures and bounded AM processing temperatures for exemplary energetic materials;

FIG. 2 is a table of print head temperatures to deposit non-energetic materials with different polymer binders and the energetic materials that are compatible with the print head temperatures;

FIG. 3 is a table of material load and density range for different non-energetic materials including a polymer binder and the required sintering temperatures;

FIGS. 5-6 illustrate a representative fragmentation warhead and integrated AM manufacturing process flow;

FIGS. 7-8 illustrate a representative shaped charge warhead and integrated AM manufacturing process flow.

DETAILED DESCRIPTION

Figure 4B:
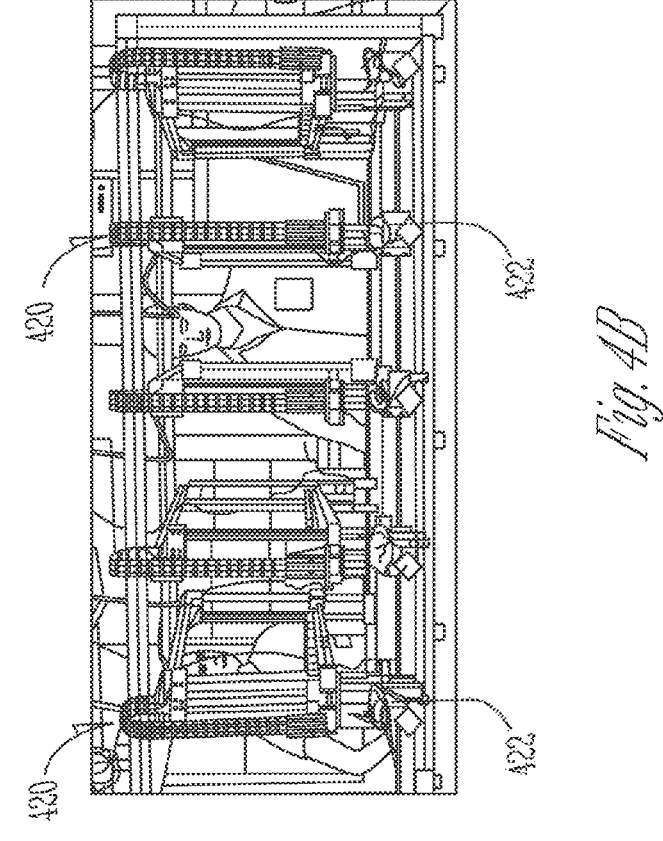
FIGS. 4A-4B illustrate different configurations of 3D Printers to implement multiple, integrated AM processes.

The present disclosure describes an integrated additive manufacturing (AM) process for an explosive payload including both energetic and non-energetic materials.

Energetic materials' AM compatibility are characterized by an onset temperature at which detonation may occur. If temperatures during manufacturing reach or exceed the onset temperature, the energetic material may detonate or decompose. If the energetic and non-energetic components are independently additively manufactured and then assembled the onset temperature is not an issue. However, in an integrated AM process, once energetic material has been deposited, any subsequent AM process, and particularly those used to build the non-energetic components, must be controlled such that the temperature of the deposited energetic material is bounded below and away from the energetic materials onset temperature.

This constraint places limitations on the energetic materials, the non-energetic materials, the polymer binders and AM process for those non-energetic materials and the final composition and density of the non-energetic components that must be considered and addressed to enable integrated AM of the explosive payload. For example, explosive compound slurries (energetic material) and metal powders (non-energetic material) cannot be fed through a common heated printer head and nozzle. Printer heads are configured for use with a specific material and to operate in a specific temperature range. The temperature range required to effectively deposit non-energetic materials such as metals or ceramics for the warhead shell is above the onset temperature of the explosive ink. This would create an unacceptable risk of detonation during manufacture. Any 3D printer or printers used to implement the integrated AM process must account for these limitations. Additionally, standard sintering processes used to remove the polymer binder from the non-energetic materials once the non-energetic components have been built are at temperatures far above the energetic material's onset temperature and thus cannot be used once energetic material has been deposited.

Additive Manufacture (AM) or 3D Printing involves the construction of three-dimensional objects. It can be done in a variety of process in which material is deposited, jointed or solidified with the material being added together (such as plastics, liquids or powder grains being fused), typically layer by layer. Originally only suitable for the production of prototypes, the precision, repeatability and material range of AM have increased to the point of producing industrial-production quality components. One of the key advantages of AM is the ability to produce complex shapes or geometries not feasible using standard SM techniques.

Fused Filament Fabrication (FFF) also know as Fused Deposition Modeling (FDM) is an AM process that uses a continuous filament formed by a previously extruded mixture of non-energetic material (metal, ceramic, glass, composite) within a polymer binder mixture. The filament is fed from a spool through a moving, heated printer head melting the binder and resulting liquid flows depositing material on a growing explosive payload. The printer head is moved under computer control with patterns based upon a computer aided draft data file to define the printed shape for the non-energetic component. Usually, the printer head moves in two dimensions to deposit one horizontal plane, or layer, at a time. The payload or the printer head is then moved vertically by a small amount to begin a new layer.

Direct Pellet Extrusion (DPE) is a process that directly extrudes molten material pellets within the AM tool during operation instead of a previously fabricated filament but is otherwise similar to FFF.

Direct Writing (DW) is an extrusion-based AM process where a viscous ink-like liquid compound is used as raw material and is extruded from a syringe by pneumatic pressure. DW enables the printing of various polymers such as epoxy and photocurable acrylic resin mixed with reinforcements such as nylon fiber, silicon carbide or carbon fiber. A 3D structure is printed through the movement of the syringe in three dimensions. Resin and its curing agent are mixed before being loaded as ink into the syringe. The ink is cured after extrusion and deposition by thermal heating or ultraviolet exposure. The rigidity of the printed material then increases significantly, enabling the printed part to main its geometry.

Stereolithography (SLA) builds 3D parts in a layer-by-layer fashion using photochemical processes by which light causes chemical monomers and oligomers to cross-link to forming crosslinked polymer layers that make up the 3D solid.

Slurry based screw extrusion refers to a mixing process where a liquid-like mixture, called a slurry, is continuously mixed and processed through a screw extruder, typically a twin-screw extruder, to achieve a uniform, well-dispersed material, often used in the production of battery electrodes where the slurry consists of active materials, binders, and solvents, allowing for precise control over the composition and consistency of the final product while minimizing solvent waste: essentially, the screw action within the extruder provides the necessary shear forces to thoroughly mix the slurry components.

Referring now to FIG. 1, a plot 100 plots the onset temperature and a 50 degree C. bounded range for common energetic materials and PBX blends including HMX (High Melting Explosive), HNS (Hexanitrostilbene), RDX (Royal Demolition Explosive cyclonite) and PETN (Pentaerythritol Tetranitrate). This list is not comprehensive with other proprietary energetic materials possessing material specific onset temperatures. If the energetic material reaches the onset temperature, the potential to go higher-order as a detonation exists. Energetic material decomposition also occurs at material specific elevated temperature values above the onset temperature. Therefore, during the manufacture of the energetic material or subsequent to the manufacture of the energetic material the temperatures of the energetic material must remain below the onset temperature and are typically kept below the bounded temperature for the particular energetic material to avoid decomposition or detonation.

Referring now to FIG. 2, a Table 200 lists the print head deposition temperature and the PBX energetics that are compatible with the deposition temperature for a number of common polymer binders for the non-energetic materials. Compatibility is based on the bounded temperature of the energetic. The print temperatures for the FFF, SLA, DW and DPE AM processes for the desired material are binder dependent. In this example, energetics RDX and PETN are not compatible for direct contact printing due to lower onset temperatures potentially being exceeded. Note, as will be described below, the addition of an insulating layer on top of the energetic material isolating non-energetic material deposition from said energetic material may, in certain circumstances, bring RDX and PETN into compatibility.

Referring now to FIG. 3, a Table 300 lists a material load by mass (the % of total mass that is the non-energetic material), a sintering temperature for the non-energetic material and a printed density with and without sintering for a representative FDM AM process. The material load by mass is the % of the total mass that is the non-energetic material. The remaining mass represents the polymer binder that is included in the material load to facilitate deposition of the non-energetic material. The printed density includes the incorporated polymer binder. The post-sinter density represents the non-energetic material once the polymer binder has been removed.

In a discrete AM process, a non-energetic component can be AM (without the constraint on deposition temperature due to the onset temperature of the energetic material), removed from the 3D printer and placed into an oven or furnace for high-temperature sintering to remove the polymer binder, and then assembled with the other non-energetic and energetic components to build the explosive payload. In an integrated AM process, sintering cannot be performed once any energetic material has been deposited. The sintering temperatures are substantially higher than the onset temperatures of any energetic material and would trigger decomposition or detonation of the energetic material. The inability to sinter the printed non-energetic material may compromise density and strength of components such as the casing, structural supports for the casing, wave shapers or penetrators. In the integrated AM process, non-energetic components that are printed prior to the deposition of any energetic material may be removed from the 3D printer, placed in an oven and sintered at elevation to remove the polymer binder and increase the density of the component, and returned to the 3D printer to complete the AM process to build the explosive payload. As such critical components such as the penetrator or shaped charge liner can be printed with the requisite density in an integrated AM process.

Figure 4A:
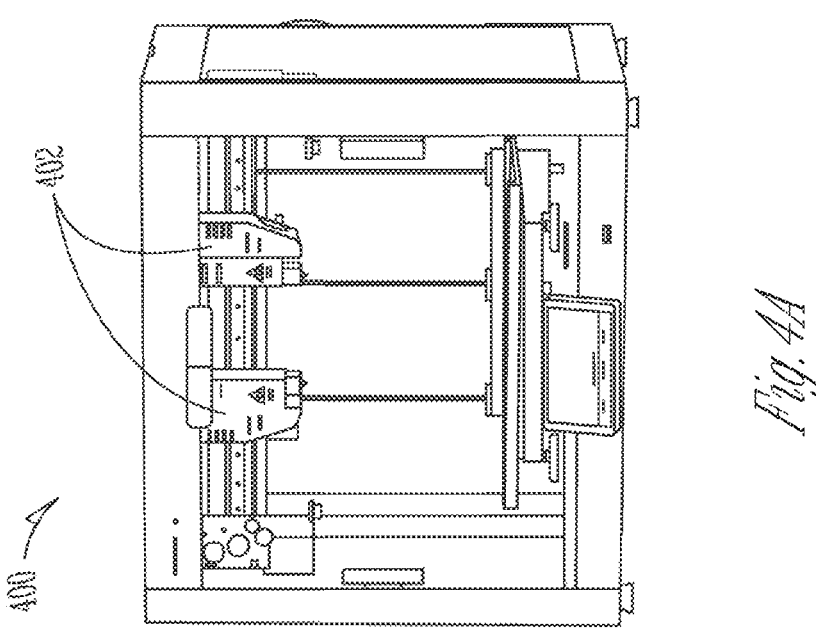

Referring now to FIGS. 4A and 4B, the integrated AM processes used to build an explosive payload including both non-energetic and energetic material can be implemented by one or more 3D Printers.

As shown in FIG. 4A, a single 3D Printer 400 is configured with a plurality of printer heads 402. Each printer head 402 is configured to deposit a single material (energetic or non-energetic) for a particular AM process. In one embodiment, all of the printer heads 402 are configured for the same AM process. For example, DPE may be used to build both the non-energetic and energetic components. In another embodiment, one or more printer heads 402 are configured to deposit one or more non-energetic materials for a particular non-energetic AM process and one or more printer heads 402 are configured to deposit one or more energetic materials for a particular energetic AM process.

As shown in FIG. 4B, a plurality of 3D Printers 420 are each configured with one or more printer heads 422. One 3D printer 420 is configured to use the one or more printer heads

422 to deposit energetic materials according to an energetic AM process. The other 3D printer 420 is configured to use the one or more printer heads 422 to deposit non-energetic materials according to a non-energetic AM process.

To design and fabricate an explosive payload using integrated AM processes, one must consider the onset temperature of the energetic material to both eliminate the risk of detonation or decomposition during manufacture and to produce an explosive payload that satisfies performance specifications as to the primary and secondary energetics, the casing, wave shaping components and penetrators. An integrated AM process that addresses the risk of detonation but produces a payload that does not meet specifications is not useful. Alternately, an integrated AM process that produces a payload to specification but that presents an unacceptable risk of detonation during manufacture is not viable either. An integrated AM process is not simply combining existing materials and AM processes for energetic and non-energetic materials.

Once energetic material has been deposited, subsequent AM processes for the deposition of non-energetic material that are either in a common layer with energetic material, formed in the next layer on a top surface or energetic material or are proximate energetic materials may present temperatures capable of heating the energetic material. The direct deposition of non-energetic material onto an energetic material's exposed surface creates the greatest risk.

To enforce the condition that the temperature of any deposited energetic material must be less than the onset temperature of the energetic material or the lowest onset temperature if there are multiple energetic materials, the AM process for the deposition of non-energetic material can be controlled such that the max energetic material's temperature is less than the onset temperature or preferably is bounded away from the onset temperature by 50 degrees C. This can be done via the proper selection of the non-energetic material and polymer binder to control the max deposition temperature and the selection of the energetic material. If material selection is insufficient to bound the temperature away from the onset temperature, an insulating layer (e.g., polymer material) may be formed on the energetic material.

A design and the integrated AM of exemplary fragmentation, shaped charge and penetrating warheads is presented. The AM as illustrated is generic to any of the viable AM processes for 3D printing energetics and non-energetics and the 3D printer configurations.

Referring now to FIGS. 5 and 6, an embodiment of a fragmentation warhead payload 500 sans the fuze assembly is built in-situ via integrated AM 600. The fuze assembly includes electronics that cannot be fabricated using AM. Different printer heads are used to deposit non-energetic and energetic material to form a bottom 502 of a payload casing 504 and a booster charge 506. As AM continues, different printer heads are used to deposit non-energetic materials to build walls 508 of payload casing 504 and a pre-formed fragmentation layer 510 and to deposit energetic materials to extend the booster charge 506 and to build a main charge 512 around the booster charge. Another printer head deposits a thin polymer to form an insulating layer 514 on top of the main charge 512. A printer head deposits non-energetic material on top of insulating layer 514 to form a top 516 of the casing. The formation of insulating layer 514 is optional, dependent upon the deposition temperature of the polymer binder in the non-energetic material and the lowest onset temperature of the booster and main charges.

Referring now to FIGS. 7 and 8, an embodiment of a shaped charge warhead payload 700 sans the fuze assembly is built in-situ via integrated AM 800. A printer head is used to deposit non-energetic material on a temporary structure 702 to form a shaped-charge liner 704 (either for the formation of a shaped charge jet or an explosively formed penetrator). If required to meet the density specification for the shaped-charge liner 704, the structure can be removed from the 3D printer, placed in an oven or furnace and sintered to remove the polymer binder and increase the density of shaped-charge liner 704 and then returned to the 3D printer to continue the integrated AM to build shaped charge warhead 700. Different printer heads deposit non-energetic and energetic materials to build walls 706 of a casing 708 and a main charge 710. A printer head deposits a thin non-energetic layer 712 having a plurality of through holes 714 that define detonation points for main charge 710. Printer heads deposit non-energetic and a different energetic material to extend walls 706 and to form an in-line booster charge 716. Once AM is complete, temporary structure 702 is removed and a fuze assembly is coupled to the booster charge 716.

Figures 9A, 9B, 10:
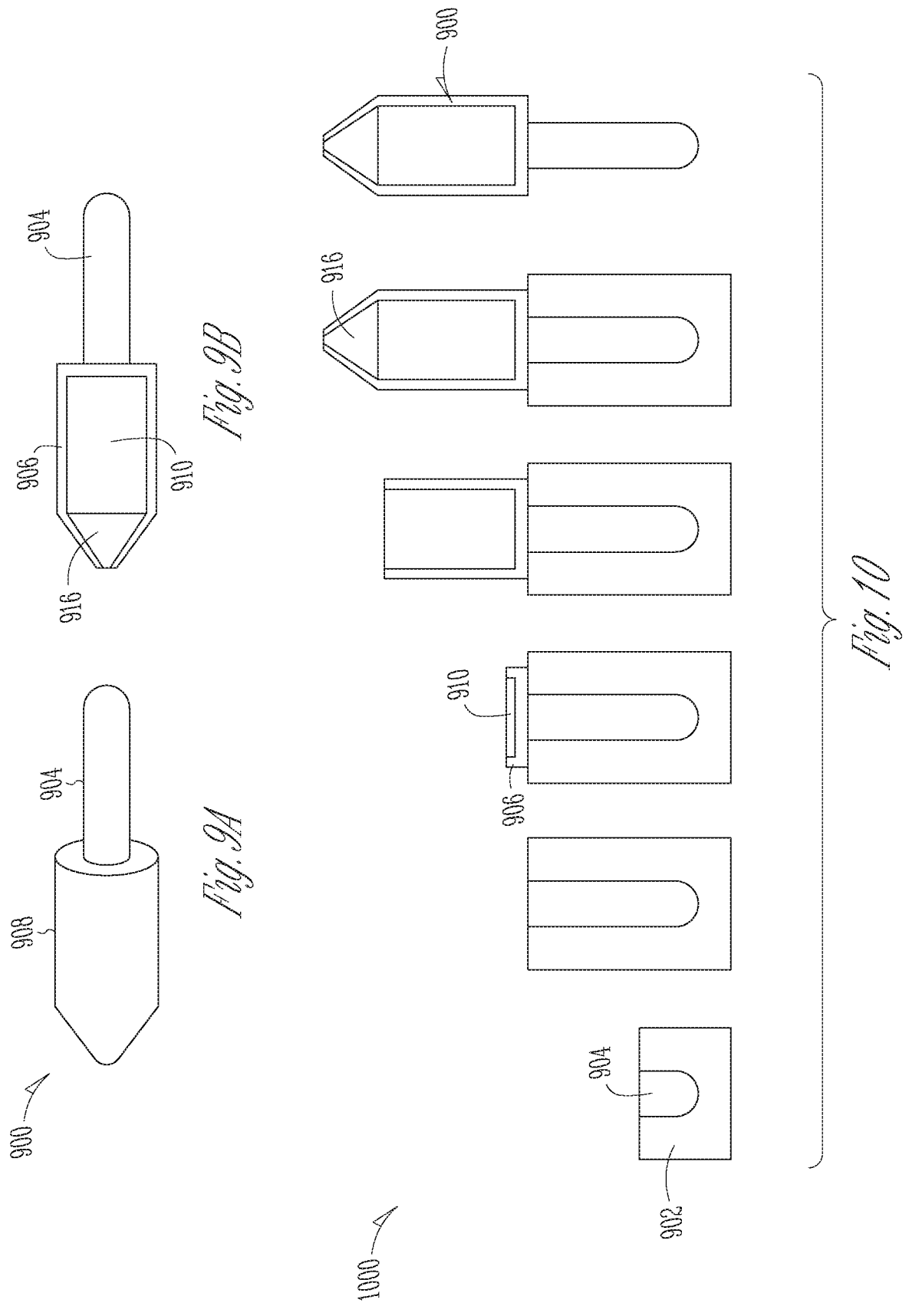
FIGS. 9A-9B and 10 illustrate a representative penetrating warhead and integrated manufacturing AM process flow.

Referring now to FIGS. 9A-9B and 10, an embodiment of a penetrating warhead payload 900 sans the fuze assembly is built in-situ via integrated AM 1000. A printer head is used to deposit non-energetic material on a temporary structure 902 to form a penetrator 904. If required to meet the density specification for the penetrator 904, the structure can be removed from the 3D printer, placed in an oven and sinter to remove the polymer binder and increase the density of penetrator 904 and then returned to the 3D printer to continue the integrated AM to finish building a penetrating warhead 900. Different printer heads deposit non-energetic and energetic materials to build walls 906 of a casing 908 and a main charge 910. Printer heads deposit non-energetic and a different energetic material to extend walls 906 and to form an in-line booster charge 916. Once AM is complete, temporary structure 902 is removed and a fuze assembly is coupled to the booster charge 916.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

We claim:

1. A method of manufacturing an explosive payload, the method comprising:

using one or more additive manufacturing processes to selectively deposit energetic and non-energetic materials in a layer-by-layer sequence to build at least one energetic component and at least one non-energetic component, in which a first portion of at least one said non-energetic component and a first portion of at least one said energetic component are built in a common layer and a second portion of at least one said non-energetic component is built on a top surface of a second portion of at least one said energetic component, wherein the energetic material has an onset temperature at which the energetic material may detonate; and controlling the additive manufacturing process that is used to build the at least one said non-energetic component such that a temperature of any deposited energetic material is bounded below and away from the energetic material's onset temperature to avoid deto-
nation or decomposition of the energetic component
during manufacture.

2. The method of claim 1, further comprising controlling
the additive manufacturing process such that the temperature
of any deposited energetic material is bounded below and
away from the energetic material's onset temperature by
minimum 50 degrees C.

3. The method of claim 1, further comprising controlling
additive manufacturing process such that a maximum tem-
perature of the process is less than the energetic materials'
onset temperature.

4. The method of claim 1, further comprising using the
additive manufacturing process to form an insulating layer
on the top surface of the second portion of the at least one
said energetic component between the second portion of said
energetic component and the second portion of the at least
one said non-energetic component.

5. The method of claim 1, further comprising controlling
the additive manufacturing process to add a polymer binder
to the non-energetic material for selective deposition and to
forego sintering at temperatures above the onset temperature
to remove the polymer binder after deposition thereby
leaving a non-zero percentage of polymer binder in the at
least one non-energetic component.

6. The method of claim 5, further comprising controlling
the additive manufacturing process to selectively deposit
non-energetic material including the polymer binder to from
a non-energetic component prior to the deposition of any
energetic material, further comprising controlling the addi-
tive manufacturing process to sinter the non-energetic com-
ponent to remove the polymer binder.

7. The method of claim 1, wherein the non-energetic
material includes a polymer binder having a deposition
temperature that is bounded below and away from the
energetic material's onset temperature.

8. The method of claim 7, wherein the energetic material
is a PBX material selected from HMX and HNS.

9. The method of claim 1, wherein the additive manufac-
turing process used to build the at least one non-energetic
component is selected from direct pellet extrusion (DPE),
fused filament fabrication (FFF), stereolithography (SLA),
direct write (DW) syringe and slurry-based screw extrusion.

10. The method of claim 1, wherein the additive manu-
facturing process used to build both the at least one energetic
component and the at least one non-energetic component is
direct pellet extrusion (DPE).

11. The method of claim 10, wherein a single 3D printing
system is configured for FDM, a first printer head is con-
figured and heated within a temperature range less than the
onset temperature of the energetic material to deposit the
energetic material, a second printer head is configured and
heated within a temperature range greater than the onset
temperature of the energetic material to deposit the non-
energetic material.

12. The method of claim 1, wherein a single 3D printing
system is configured with a plurality of printer heads for
different additive manufacturing processes to build the at
least one energetic component and the at least one non-
energetic component.

13. The method of claim 1, wherein a first 3D printing
system is configured for a first additive manufacturing
process to build the at least one energetic component, a
second 3D printing system is configure for a second additive
manufacturing process to build the at least one non-energetic
component, wherein the explosive payload is moved backand-forth on a stage between the first and second 3D printing
systems to build the explosive payload.

14. The method of claim 1, wherein the additive manu-
facturing processes builds the at least one energetic compo-
nent to include an internal booster charge and a main charge
each formed from an energetic material having an onset
temperature, further comprising controlling the additive
manufacturing process such that the temperature of any
deposited energetic material is bounded below and away
from the lowest onset temperature.

15. The method of claim 14, wherein the explosive
payload is a fragmentation warhead and the internal booster
charge is positioned axially at the center of the main charge,
wherein the additive manufacturing processes build a casing
as the non-energetic component and the internal booster
charge and main charge layer-by-layer.

16. The method of claim 14, wherein the explosive
payload is a shaped charge warhead and the internal booster
charge is positioned axially in line with the main charge,
wherein the additive manufacturing processes build a
shaped-charge liner and a casing as the non-energetic com-
ponents and the main charge and internal booster charge
layer-by-layer.

17. The method of claim 16, wherein the shaped charge
liner is formed prior to any energetic material for the main
charge or internal booster charge, wherein the non-energetic
material used for the shaped charge liner includes a polymer
binder, further comprising:

sintering the shaped charge liner at a temperature above
   the energetic material's onset temperature to remove
   polymer binder and increase the density of the shaped-
   charge liner.

18. The method of claim 14, wherein the explosive
payload is a penetrating warhead and the internal booster
charge is positioned axially in line with the main charge,
wherein the additive manufacturing process builds a pen-
etrator and a casing as the non-energetic components and the
main charge and internal booster charge layer-by-layer.

19. The method of claim 18, wherein the penetrator is
formed prior to any energetic material for the main charge or
internal booster charge, wherein the non-energetic material
used for the penetrator includes a polymer binder, further
comprising:

sintering the penetrator at a temperature above the ener-
   getic material's onset temperature to remove polymer
   binder and increase the density of the penetrator.

20. An explosive payload, comprising:

at least one energetic component formed from at least one
   energetic material, said at least one energetic material
   having an onset temperature at which it may detonate, at least one non-energetic component formed from at least
   one inert material, wherein a first portion of the at least one non-energetic
   component and a first portion of the at least one
   energetic component are formed in a common layer;

wherein a second portion of the at least one non-energetic
   component is formed on a top surface of a second
   portion of the at least one energetic component;

wherein the at least one energetic component and at least
   one non-energetic component are created via one or
   more additive manufacturing processes to selectively
   deposit energetic and non-energetic materials in a
   layer-by-layer sequence;

wherein the additive manufacturing process that is used to
   build the at least one said non-energetic component is
   controlled such that a temperature of any deposited
   energetic material is bounded below and away from the energetic material's onset temperature to avoid detonation or decomposition of the energetic component during manufacture.

* * * * *